UNITED STATES PATENT OFFICE.

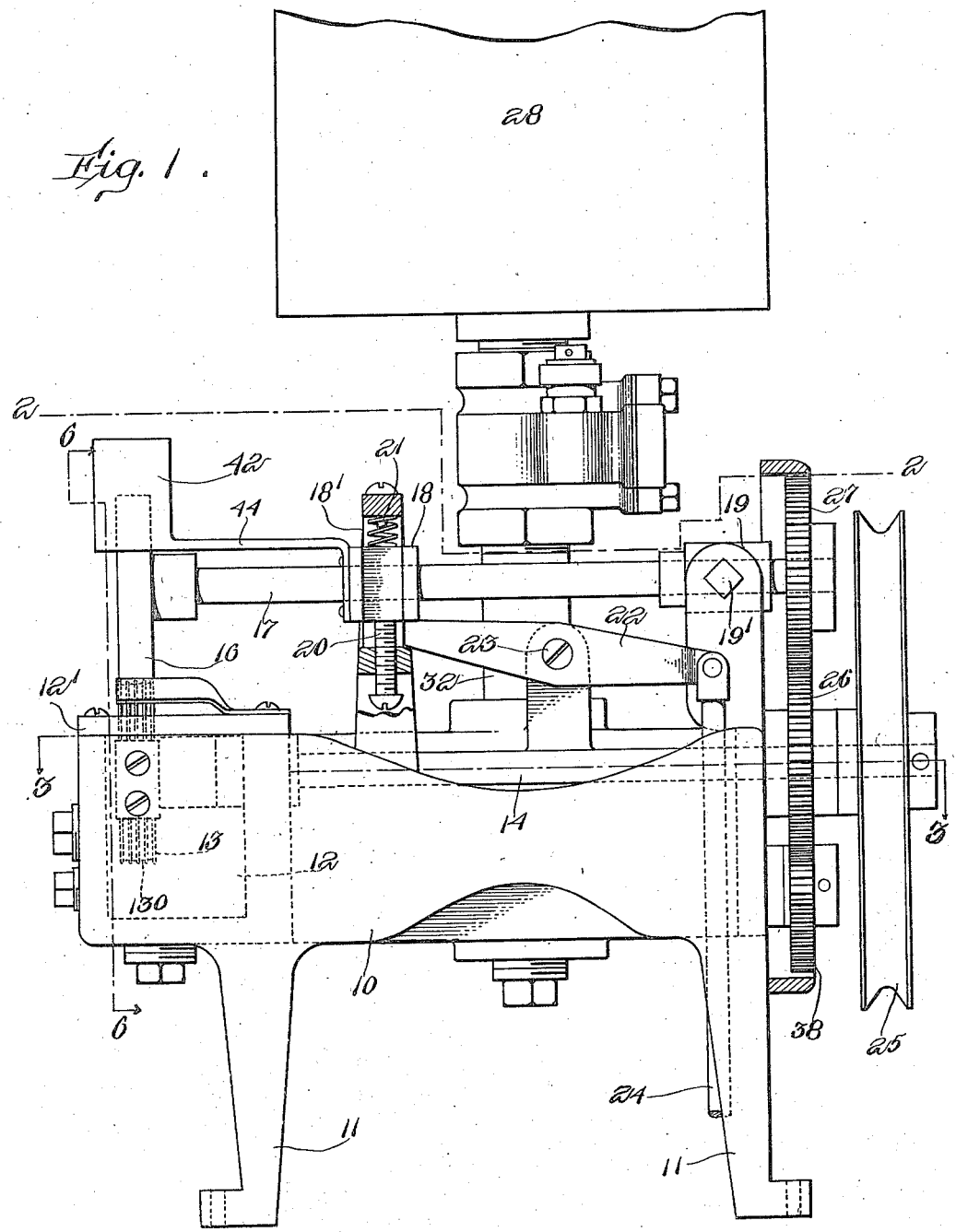

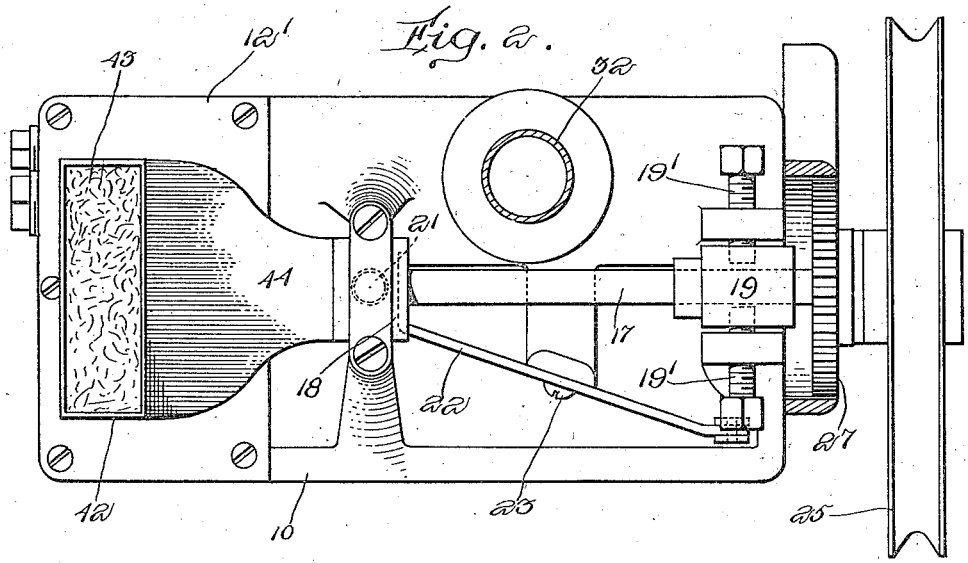
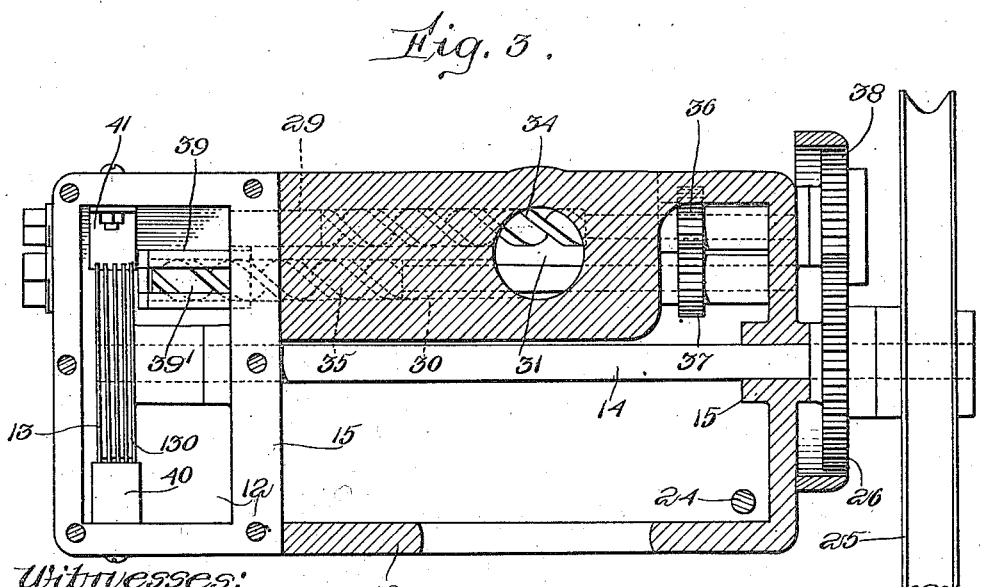

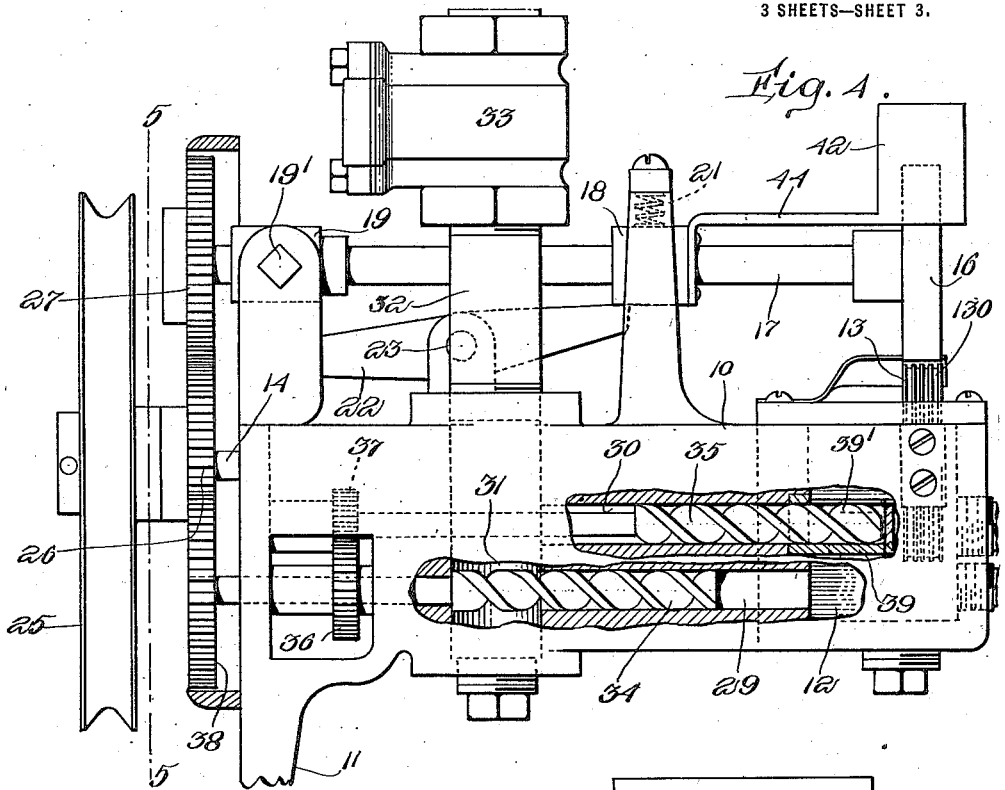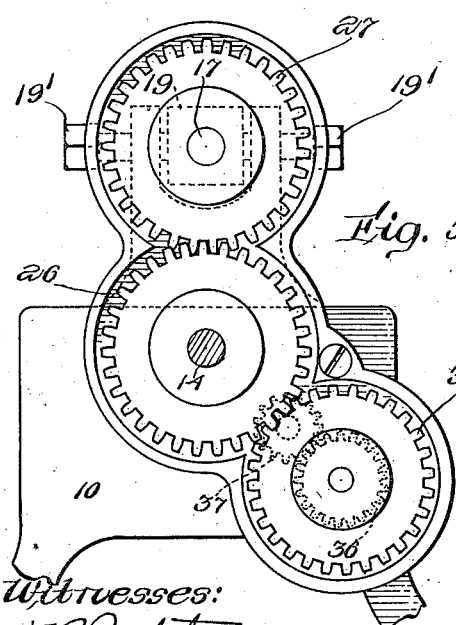

FRANK A. BRACKETT, OF BINGHAMTON, NEW YORK, ASSIGNOR OF ONE-HALF TO FRED L. EMERSON, OF BINGHAMTON, NEW YORK.

CEMENTING-MACHINE.

1,192,379.   Specification of Letters Patent.   Patented July 25, 1916.

Application filed January 20, 1910. Serial No. 539,195.

*To all whom it may concern:*

Be it known that I, FRANK A. BRACKETT, of Binghamton, in the county of Broome and State of New York, have invented certain new and useful Improvements in Cementing-Machines, of which the following is a specification.

This invention relates to cementing machines such as those employed in the manufacture of shoes, for administering cement uniformly to the marginal portions of leather, or other material which requires small quantities of cement upon its surface. Such cement is frequently thick and very sticky and is difficult to supply properly to the applying devices. Moreover it frequently contains volatile materials which rapidly evaporate when exposed to the atmosphere.

The machine herein illustrated and described includes a roll and a tank or chamber containing a body of cement into which the roll dips for causing the adherence of the cement to its periphery. In the illustrated embodiment of the invention, the roll applies the cement directly to the article to be coated, and a roll located thereabove is employed to coact therewith in feeding the work. The rolls are driven by any suitable mechanism, and the upper roll is pressed toward the lower applying roll with yielding tension.

In order that the body of cement in the tank or chamber may be maintained at a constant level so as to preserve the relation of the body of cement and the roll which dips therein, I provide for the constant feeding of cement thereto in greater quantities than demanded by the needs of the applying roll, and the discharge of the surplus cement. The discharge port is located at the desired level and regulates the height of the body of cement in the tank or chamber.

The feed of the cement may be accomplished by any desired means such as a screw conveyer which is driven by suitable mechanism. In the present embodiment of the invention, the cement is stored in a receiving receptacle or reservoir from which it flows to the conveyer by gravity, and inasmuch as in said embodiment the said receptacle is located above the tank or chamber, the surplus cement entering the discharge port is forcibly conducted therefrom to the conduit leading from the reservoir to the conveyer which forces the cement into said chamber or tank.

The device for effecting the forcible discharge of the cement, in the illustrated embodiment of the invention consists of a bladed conveyer, which is of such character that it is capable of removing a greater volume of cement than the feeding conveyer is capable of delivering. As shown, the two conveyers are driven by suitable gearing, the discharge conveyer being rotated at a greater speed than the feeding conveyer.

Referring to the drawings, which illustrate one form in which the invention may be embodied,—Figure 1 represents a side elevation of a cement machine of which a portion appears in section. Fig. 2 represents a horizontal section on line 2—2 of Fig. 1. Fig. 3 represents a horizontal section on line 3—3 of Fig. 1. Fig. 4 represents a side elevation of the principal parts of the machine of which portions of the frame or casing are broken away. Fig. 5 represents a section on line 5—5 of Fig. 4. Fig. 6 represents a section on line 6—6 of Fig. 1.

The same reference characters indicate the same parts wherever they occur.

The frame of the machine is indicated at 10 and is provided with legs or feet 11. The frame is formed with a tank or chamber 12 which is covered by a plate 12' provided with an opening 13' for the reception of a roll hereinafter described. This chamber is for the reception of cement and of an applying roll 13. The said roll is affixed upon one end of a shaft 14 which is mounted in fixed bearings 15 in the frame. The roll 13 coöperates with a roll 16 which is affixed upon one end of a shaft 17 to feed the work. The shaft 17 is arranged directly above the shaft 14 and is mounted in bearings 18 and 19. The bearing 19, see Fig. 2, is mounted upon trunnions 19', 19', and the bearing 18 is mounted between guides such as indicated at 18' in Fig. 1. The bearing 18 is moved toward and from the shaft 14 and is held against an adjustable stop 20 by a spring 21. In this way the roll 16 is pressed toward the roll 13 with yielding tension and the two rolls are therefore adapted to feed the work which is inserted between them. The roll 16 may be raised from the roll 13 by a lever 22 pivoted at 23 and arranged so that one end may abut against the under surface of the bearing block 18. A rod 24 connected to the lever 22 may be also connected to a treadle not shown. When the treadle is in one position, the pressure and feeding roll is held against the tension of spring 21 away from the roll 16, and, when the treadle is in its other position, the spring is permitted to hold the pressure roll yieldingly against the work on the cement applying roll. The shaft 14 is provided with a pulley 25 by which it may be driven, and with a gear 26. The gear 26 intermeshes with a gear 27 affixed upon the shaft 17 in close relation to the bearing 19. A slight degree of freedom between the gears 26, 27 is sufficient for the necessary separation of the rolls 13 and 16.

Cement is supplied to the tank or chamber 12 from an external source of cement such as a reservoir 28 which is shown as arranged above the horizontal plane of the chamber. The frame 10 is formed with feed and discharge ducts indicated respectively at 29 and 30 in Figs. 4 and 6. The two ducts communicate with an intermediate chamber 31 to which the cement for the rolls is conducted by a pipe 32 from the reservoir 28. The pipe may, if desired, be provided with a valve 33 which can be closed when the machine is not in operation. When the valve is open, the chamber 31 is kept filled with cement and the cement is fed in a constant stream to the chamber 12 through the feeding duct 29 by a tightly fitting conveyer 34. The duct 30 is occupied by a similar tightly fitting conveyer 35 which is rotated in a direction to force the discharged cement from the chamber 12 to the chamber 31. The conveyers may be driven by any suitable means such as belts, chains, or gears. In this embodiment of the invention the shafts of the two conveyers are connected by intermeshing gears 36 and 37, see Fig. 5, of which the gear 36 is considerably larger than the gear 37. The two conveyers are driven by a gear 38 affixed upon the shaft of the conveyer 34 and intermeshing with the gear 26. The purpose of providing a relatively large gear for the conveyer 34 and a relatively small gear for the conveyer 35 is to effect a slower speed of rotation of the conveyer which supplies cement to the chamber 12 than the speed of rotation of the conveyer by which the cement is conducted away from the chamber 12, so that the cement in the chamber or tank 12 may never rise above a predetermined level.

One end of the conveyer 35 extends beyond the end of the duct 30 into the chamber 12 and is partly surrounded by a sleeve 39 which is formed with a discharge port opening 39′ at the top, as shown by Figs. 3, 4 and 6, through which the surplus cement flows from the chamber 12 into the conveyer duct 30. The bottom of the roll 13 is approximately in the horizontal plane of the bottom of the conveyer 35 and is consequently immersed in cement which may rise to, but not substantially above, the level of the opening in the sleeve 39. The surplus cement passes into the discharge port or opening in said sleeve and is forcibly conducted back to the chamber 31 from which it is again conducted to the chamber 12 by the conveyer 34. In this way a continuous circulation of the cement is effected, a supply of cement being constantly fed to the tank or chamber 12, greater than the need of the applying roll.

It will be noted that the supply duct or conduit enters the chamber 12 at the bottom thereof, or at a point below the level of the cement. The purpose of this is to insure the constant changing of the body of cement in said chamber, and to prevent any material portion remaining therein, and becoming, through possible evaporation of its volatile constituents, thicker and more viscid. The chamber 12 is comparatively small, and a constant supply of the cement wells up under the applying roll, but the level of cement in said tank remains constant, as previously explained.

The periphery of the roll 13 is formed with grooves 130 which are separated by ribs or flanges. The provision of the grooves is to regulate the amount of cement deposited upon the work. The rolls are driven in the directions indicated by the arrows in Fig. 6 and the peripheral surface of the ribs is engaged by a scraper 40 which removes all cement from the periphery of the roll with the exception of that contained in the grooves. The cement thus carried in the grooves is applied to the under surface of the work which is fed by the rolls and whatever cement remains in the grooves after having passed the point of engagement with the work, is removed from the grooves by a scraper 41 which is formed with teeth projecting into the grooves, see Fig. 3. The old cement is thus cleaned out of the grooves and the grooves are thereafter filled with fresh cement.

The two scrapers 40, 41 are formed of resilient metal and are bent as shown in Fig. 6 so that their free ends are approximately radial to and bear yieldingly against the periphery of the roll. They are attached at their outer ends to the walls of the chamber or tank by suitable fastenings such as bolts and nuts 46, 47 respectively. In order that the pressure of their free ends against the roll may be increased or diminished, according to the thickness or adhesiveness of the cement, adjusting screws 48, 49 are passed through said walls and bear against the scrapers near their attached ends, for, of course, when said screws are adjusted inwardly, the spring pressure of the scrapers against the roll is increased, and, when they are withdrawn, the spring pressure is diminished. Although the scrapers are located within the practically closed tank, they are adjustable by means accessible externally of the tank.

For the purpose of keeping the surface of the roll 16 clean, a holder 42 is provided as a receptacle for a quantity of cleaning material such as cotton waste indicated at 43 in Figs. 2 and 6. The holder 42 is provided with an arm 44 which is affixed to the bearing block 18, so as to bodily move with the feed roll 16. The bottom wall of the holder is provided with an opening 45 for the reception of the roll 16. By this means the periphery of the roll is continually wiped. A gage and work presser is shown at 50 which is secured to the top plate 12' and projects over the periphery of the roll 13 on its up-turning side, as shown in Fig. 6 to hold the work thereagainst. In end elevation, its free end is arcuate and concentric with the roll 13, and its rear end is attached by suitable fastenings to the top plate.

Having thus explained the nature of my invention and described a way of making and using the same, although without attempting to set forth all of the forms in which it may be made or all of the modes of its use, I declare that what I claim is:—

1. A cementing machine for applying cement to the under side of flexible material, comprising an upper work-pressing roll, a narrow lower cement-applying roll, a chamber having a slotted top or cover from which a portion of said applying roll upwardly emerges for engagement with the work, said chamber being formed with an overflow which determines the height of the cement therein and the depth of immersion of the applying roll into said cement, a closed reservoir for cement, ducts connecting said chamber with said reservoir, one of said ducts being arranged to receive cement from said overflow, and screw conveyers arranged in said ducts positively to feed cement into and away from said chamber, and mechanism for rotating said rolls and said conveyers.

2. In a cementing machine, a reservoir for cement, a chamber having a discharge outlet which determines the height of the body of cement in said chamber, a cement applying roll having a portion of its periphery below the said outlet and a portion above the level of the cement to apply cement to work exterior to said chamber, ducts communicating with said outlet and with said chamber respectively and also with said reservoir, discharge and feeding screw conveyers in said respective ducts, a power shaft, and power-transmitting mechanism actuated by said shaft for operating said conveyers at different speeds.

3. In a cementing machine, a closed reservoir for cement, a chamber lower than the reservoir and closed except for a slot in its top, an overflow, two closed ducts communicating one with the reservoir and the lower part of the chamber and the other with said reservoir and the overflow, a cement-applying roll dipping into the cement in the chamber and having a portion emerging through the slot, and screw conveyers in said ducts, one for feeding cement from the reservoir and the other for feeding cement from the overflow back to the reservoir.

4. A cementing machine, comprising a chamber, a cement-feeding roll dipping into the cement into said chamber and having a portion of its periphery projecting out of said chamber for engagement with the work, a closure for said chamber having a slot through which said roll projects, a cement-containing supply chamber laterally removed from the first-mentioned chamber and in approximately the same horizontal planes therewith, horizontal supply and discharge conduits connecting said chambers, and means for circulating cement from said supply chamber through the supply conduit to said first-mentioned chamber and through said discharge conduit to said supply chamber.

5. A cementing machine, comprising a tank or chamber for cement, an external source of cement, a feeding roll the periphery of which is rotatably movable into and out of said chamber to apply cement to work exterior to said chamber, a slotted closure for said tank or chamber through which said roll projects an inlet or feeding duct and a discharge or return duct extending from said external source to said chamber, said return duct opening into said receiving chamber above the plane of the lowest part of said roll, and said inlet duct opening into said chamber below the return duct, means for circulating cement through said inlet duct from said external source to said chamber, and through said return duct from chamber, and through said return duct from said chamber to said external source, thereby maintaining a predetermined level of the cement in said chamber irrespective of the withdrawal of cement by said roll, and a manually controlled spring-tensioned pressure roll above and coöperating with said cement feeding roll.

6. A cementing machine comprising a frame having a stationary cement tank, a cement-applying roll dipping into said tank, a coacting work feed roll located above the first-mentioned roll and movable toward and from the latter to grip and feed the work, a pair of parallel shafts on which said rolls are respectively mounted, gearing loosely connecting said shafts, stationary bearings for the shaft carrying the cement-applying roll, a bearing in which the shaft for the movable roll is journaled at a point adjacent said gearing, a pivot for said bearing transverse to said shaft, a spring for pressing said movable-roll shaft toward the other shaft, and a treadle-controlled lever pivoted on the frame for moving the said movable-roll shaft in the opposite direction to raise the pressure roll from the cement-applying roll.

7. In a cementing machine, a frame having a stationary cement chamber, a shaft journaled in stationary bearings on said frame and having a fixed roll dipping into said tank, a second parallel shaft having a roll thereon above and coacting with said fixed roll, gearing loosely connecting said shafts, a movable bearing for said second shaft located adjacent said gearing, a transverse pivot connecting said bearing to said frame, a bearing near the free end of said shaft, a guide for said second bearing, a spring bearing against said second bearing yieldingly to move said movable roll in one direction to said fixed roll, and means independent of the work and controlled by the operator to move the movable roll in the opposite direction relatively to the fixed roll, said means comprising a treadle-controlled lever engaging the second-mentioned bearing.

8. In a cementing machine, a frame having a cement chamber, a shaft journaled in stationary bearings on said frame and having a fixed roll dipping into said tank, a second parallel shaft having a roll thereon above and coacting with said fixed roll to grip and feed the work, gearing loosely connecting said shafts, a bearing for said second shaft located adjacent said gearing, a transverse pivot connecting said bearing to said frame, a bearing for the free end of said shaft, a guide for said second bearing, a spring bearing against the second bearing yieldingly to move said movable roll relatively to said fixed roll in one direction, and a manually-operated lever engaging said second bearing to move it against the pressure of said spring in the other direction.

9. A cementing machine, comprising a closed tank or chamber having a slotted top, a supply chamber, a cement-applying roll located in said tank, projecting through the slot and dipping into the cement in the tank to carry cement upon the periphery for application to the work exterior to said tank, and means closed to the atmosphere for preserving the level of the cement in the tank, said means comprising an inlet duct leading from the supply chamber to said tank and terminating below the level of the cement, a rotary conveyer in said inlet duct for forcing the cement in a continuous stream into the lower portion of said tank from said external source, and a discharge outlet located at the desired level of said cement for discharging cement from said tank back to said chamber, whereby cement is continuously supplied to said tank, and is discharged therefrom at a predetermined level.

10. A cementing machine comprising a tank, an applying roll located in said tank and dipping into the cement therein to carry cement upon the periphery for application to the work exterior to said tank, and means for preserving the level of the cement in the tank, said means comprising a reservoir, a supply chamber connected with said reservoir, an inlet duct located below the predetermined level of said cement in the tank, a rotary bladed conveyer in said duct for forcing cement therethrough in a continuous stream from said reservoir source into the tank, a discharge outlet located at the predetermined level and a rotary helical conveyer in said discharge outlet to discharge cement to said chamber, thereby maintaining a predetermined relation between the applying roll and the body of cement.

In testimony whereof I have affixed my signature, in presence of two witnesses.

FRANK A. BRACKETT.

Witnesses:
 EUGENE R. MCCARTHY,
 WM. H. H. KENNEDY.